United States Patent [19]

Kirk

[11] Patent Number: 5,057,939

[45] Date of Patent: Oct. 15, 1991

[54] DATA COMPRESSION

[75] Inventor: Richard A. Kirk, Hertfordshire, England

[73] Assignee: Crosfield Electronics Ltd., England

[21] Appl. No.: 436,589

[22] Filed: Nov. 15, 1989

[30] Foreign Application Priority Data

Nov. 25, 1988 [GB] United Kingdom ................ 8827556

[51] Int. Cl.$^5$ .............................................. H04N 1/40
[52] U.S. Cl. ................................ 358/426; 358/261.3; 358/261.4; 341/79
[58] Field of Search ............ 358/426, 429, 430, 261.1, 358/261.2, 261.3, 261.4, 427, 428, 262.1; 341/79, 153, 154, 51, 60, 87, 95, 167

[56] References Cited

U.S. PATENT DOCUMENTS 4,464,650  8/1984  Eastman et al. ................... 341/51

FOREIGN PATENT DOCUMENTS 2259702  7/1973  Fed. Rep. of Germany .
2262348  9/1975  France .

OTHER PUBLICATIONS

IEE Proceedings, vol. 133, Apr. 1986, Morris et al., "Graph Theory for Image Analysis: An Approach Based on the Shortest Spanning Tree".
IEE Proceedings, vol. 130, Aug. 1983, Mitrakos et al., "Nonlinear Image Processing for Optimum Composite Source Coding".
8180 IEEE Transactions on Pattern Analysis & Machine Intel., vol. PAMI-2, Jan. 1980, Kawaguchi et al., "On a Method Binary-Picture Representation and Its Application to Data Compression".

Primary Examiner—Edward L. Coles, Sr.
Assistant Examiner—Jerome Grant, II
Attorney, Agent, or Firm—Sughrue, Mion, Zinn, Macpeak & Seas

[57] ABSTRACT

A method of compressing digital image or image-like pixel data. The method comprises carrying out the following steps on small blocks of pixels:

a) determining the differences between digital values of adjacent pixels in the block to define respective link weights;
b) determining a tree connecting all the pixels in the block such that the sum of the link weights in the tree is a minimum;
c) dividing the tree into segments by removing links with weights greater than a threshold value, so dividing the block into segments of linked pixels;
d) generating a segmented representation of the block by setting the values of all pixels in each segment to a single, respective, representational value; and
e) compressing the segmented representation to generate compressed data.

11 Claims, 3 Drawing Sheets

```
01 02 18 21
04 03 17 22
05 10 19 24
04 05 18 23
```

```
01-(+1)->02           18-(+3)->21
          |            |         |
         (+1)         (-1)      (+1)
          |            |         |
          V            V         V
04-(-1)->03           17        22
 |                     |         |
(+1)                  (+2)      (+2)
 |                     |         |
 V                     V         V
05-(+5)->10-(+9)->19            24
 |                     |         |
(-1)                  (-1)      (-1)
 |                     |         |
 V                     V         V
04-(+1)-> 05          18        23
```

| 4 | 4 | 20 | 20 |
|---|---|----|----|
| 4 | 4 | 20 | 20 |
| 4 | 4 | 20 | 20 |
| 4 | 4 | 20 | 20 |

| -3 | -3 | -2 | 1 |
|----|----|----|---|
| 0  | -2 | -3 | 2 |
| 1  | 5  | -1 | 4 |
| 0  | 1  | -2 | 3 |

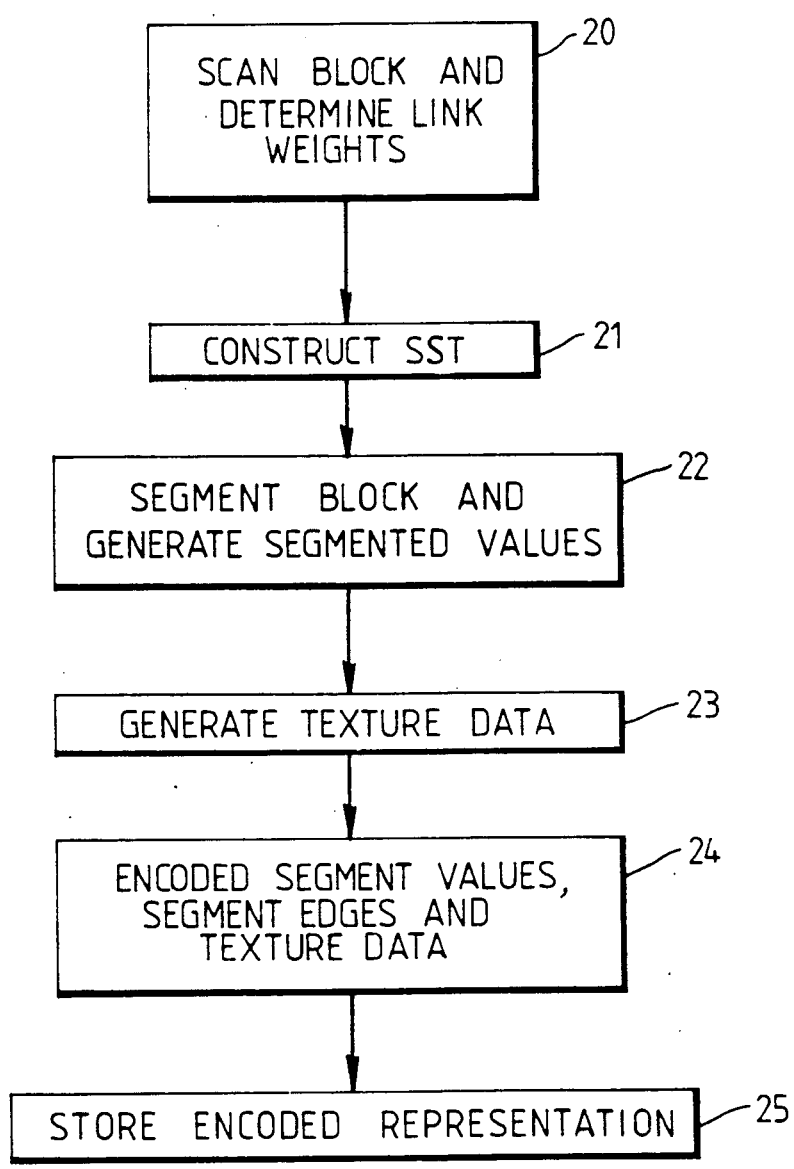

DATA COMPRESSION

FIELD OF THE INVENTION

The invention relates to methods and apparatus for compressing digital image or image-like pixel data.

DESCRIPTION OF THE PRIOR ART

In this context image data defines the colour content of pixels of an image while image-like data defines pre or post processed (eg. filtered or compressed) image data.

Conventional electronic image generation involves the scanning of original pictures and text to generate an electronic representation of the pictures and text at a relatively high resolution. Resolutions of 300×300 pixels per square inch up to 1800×1800 pixels per square inch are common. In the case of monochrome images, each pixel is coded by a single digital value defining the grey level of that pixel, the value typically lying between zero and 255. For coloured images, each pixel is typically coded by three or four digital values which may define for example the colour components cyan, magenta, yellow and black or the components of luminance and chrominance. In all these cases, a very large amount of digital data is generated leading to problems of storage and, where the data is to be transmitted to a remote station, problems of long transmission times.

Conventionally, these problems have been reduced by applying data compression techniques to the data. An example of such a technique is run length encoding. Another technique is known as transform coding; this is able to code textures well but is not so efficient in coding sharp edges. More recently segmentation techniques have been developed that code sharp edges well, but hitherto have not performed well on smooth shading.

SUMMARY OF THE INVENTION

In accordance with one aspect of the present invention, a method of compressing digital image or image-like pixel data comprises carrying out the following steps on small blocks of pixels:
a) determining the differences between digital values of adjacent pixels in the block to define respective link weights;
b) determining a tree connecting all the pixels in the block such that the sum of the link weights in the tree is a minimum;
c) dividing the tree into segments by removing links with weights greater than a threshold value, so dividing the block into segments of linked pixels;
d) generating a segmented representation of the block by setting the values of all pixels in each segment to a single, respective, representational value; and
e) compressing the segmented representation to generate compressed data.

In accordance with a second aspect of the present invention, apparatus for compressing digital image or image-like pixel data comprises means for determining the differences between digital values of adjacent pixels in the block to define respective link weights; means for determining a tree connecting all the pixels in the block such that the sum of the link weights in the tree is a minimum; means for dividing the tree into segments by removing links with weights greater than a threshold value, so dividing the block into segments of linked pixels; means for generating a segmented representation of the block by setting the values of all pixels in each segment to a single, respective, representational value; and means for compressing the segmented representation to generate compressed data.

This new method and apparatus for analysing image data makes use of certain graph theory techniques which are described in detail in "Graph Theory for image analysis: an approach based on the shortest spanning tree" by Morris et al, IEEE proceedings, vol 133, part F, No. 2, April 1986, pages 146-152. However, we have appreciated that it is not sufficient simply to apply this known technique to segment an entire image. This is because it may well be possible to construct a large path network (or tree) which connected pixels of very different type via a series of pixels in which the individual differences (or link weights) between adjacent pixels is small. For example, consider the case of a smooth vignette on a white background, the vignette smoothly varying from pure white to pure black. The straight forward application of the "shortest spanning tree" technique to this vignette will result in the shortest spanning tree extending from the pure white to the pure black joined by small links through all the different greys. If the image is divided into segments by breaking the links in the tree with weights above a threshold, the vignette and the background would all form one large segment regardless of the sharp edge between the black end of the vignette and the white background.

Recursive segmentation techniques overcome this problem by linking the two adjacent segments with the closest values starting with the original pixel values and continuing until the image is divided into the right number of segments. The segmented image now contains all the sharp edges that the original image had, but a vignette is now divided up into a series of segments.

In some cases, the values set in each segment will be sufficiently close to the real values that there is no need to store the difference or texture data since there will be little degradation.

In other cases, however, the invention further comprises generating a texture representation of the block constituted by the differences between each actual pixel value in the block and the corresponding segmented representation pixel value.

The invention uses the original 'shortest spanning tree' technique, but restricts its application to small regions or blocks of the image to avoid the problems with vignettes in extended images. The texture representation will not contain any edges in the vignetted regions, and will typically contain little but the slow gradients, and so may be easily encoded by for example transform coding. In some cases, however, the texture representation need not be compressed.

The term "tree" means a branched path that has no closed loops.

The term "small" is intended to indicate that the blocks are not only smaller than the image but also with respect to smooth features of the image.

The size of each block of pixels will be chosen empirically in practice but typically will be 8×8 pixels.

Typically, the representational value of a segment will be chosen to be the average of the pixel values in the segment although other values could also be used.

The compression techniques applied to the segmented and texture representations respectively are chosen to optimise the compression achieved and typically the segmented representation may be compressed using a run length or quadtree compression while the texture representation can be compressed using a thresholding technique.

Another refinement would be to have a pre-pass process over the image to square the edges and filter out noise before segmenting.

In a further refinement, the success of the compression achieved by a method according to the invention can be compared with other methods for compressing the block and the best chosen. For example, a method according to invention can be compared with a method involving conversion of the pixel values into the frequency domain.

Typically the processing means will comprise a suitably programmed microcomputer although the various steps could be performed by respective hardware components.

BRIEF DESCRIPTION OF THE DRAWINGS

An example of a method and apparatus according to the invention will now be described with reference to the accompanying drawings, in which:

FIG. 7 is a flow diagram illustrating operation of the apparatus shown in FIG. 6.

DETAILED DESCRIPTION OF AN EMBODIMENT

Figures 1, 2, 3:
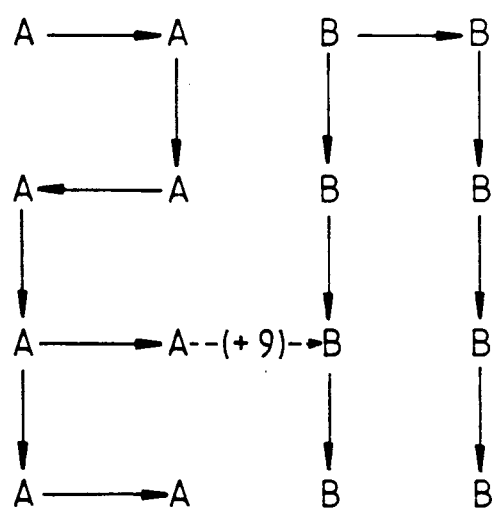
FIG. 1 illustrates the digital values making up a pixel block.
FIG. 2 illustrates a shortest spanning tree for the pixel block of FIG. 1.
FIG. 3 illustrates the segmentation of the pixel block.

FIG. 1 illustrates in diagrammatic form the digital values corresponding to a 4×4 pixel block. In this example, a single array of values will be considered corresponding for example to a monochrome image or a single colour separation. In practice, in the case of a coloured image, the segmenting of the block may be carried out on a single colour component and then the pixel values for each colour component will be compressed as a result of the previous determination.

Figures 4, 5, 6:
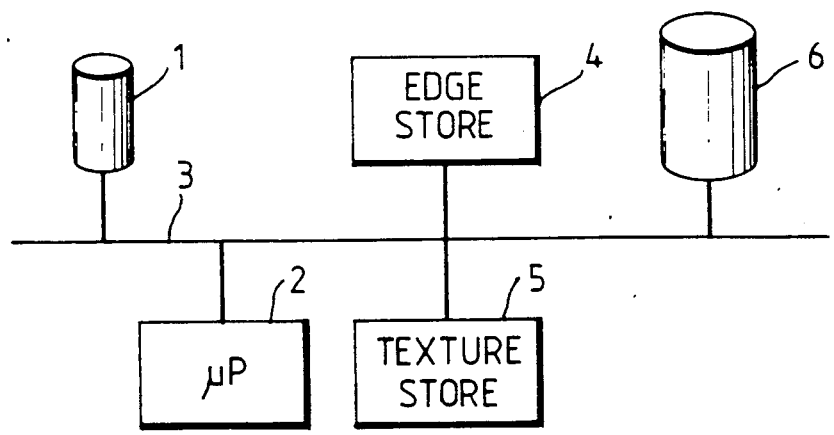
FIG. 4 illustrates the pixel values in the segmented block.
FIG. 5 illustrates the texture representation of the block.
FIG. 6 is a block diagram of the apparatus.

The values shown in FIG. 1 represent grey levels and will initially be stored in a disc store 1 (FIG. 6). These values may have been generated either electronically or by scanning an original image using a conventional electronic scanning system such as the Crosfield Electronics Magnascan system. The processing of the digital values is controlled by a microprocessor 2 coupled with a data bus 3 to which the store 1 is also coupled.

Initially, the block of data values is scanned to determine the differences or link weights between each adjacent pair of pixels (step 20, FIG. 7). Following that determination, a non-closed path or tree between all the pixels in the block is determined with a length defined by the sum of the link weights between adjacent pixels in the path and the path chosen being determined such that the length of the path connecting the pixels is a minimum. This path is known as the shortest spanning tree (SST) and can be determined using the techniques described in the paper mentioned above. This step is indicated as step 21 in FIG. 7 and FIG. 2 illustrates the SST for the pixel block shown in FIG. 1. The link weights in FIG. 2 are indicated by the values in brackets.

It can immediately be seen by viewing FIG. 2 that an edge in the image is visible between the generally high pixel values on the right hand side of the block and the lower values on the left hand side. However, in addition to the existence of an edge there is some variation of pixel values which is not easily described by edges.

In the next step the microprocessor 2 segments the block by breaking the links above a threshold, in this case set at 8. (Step 22). This threshold will be set empirically. In this example one link has been broken and two segments created (FIG. 3). The pixel values after segmentation are set to the segment average rounded to the nearest integer (A or B). In this case A=4 and B=20 (FIG. 4). A and B could be set to other values if appropriate. As can be seen in FIG. 4, there is clear edge defined between the left and right hand segments of the block but all the fine structure is lost.

The microprocessor then determines the difference between each edge representation pixel value and the actual value of the pixel, as seen in FIG. 1, to generate the texture representation as shown in FIG. 5 (step 23). It will be appreciated that the sum of the pixel value pairs in FIGS. 4 and 5 lead to the original pixel data shown in FIG. 1. The two representations are stored in respective stores 4, 5 which may be constituted by separate storage elements or different parts of a common store.

The edge representation data of FIG. 4 is well suited to run length, quadtree or some other form of coding that is suitable for compacting edges and the microprocessor then carries out such a technique on the data in the store 4 (step 24). The texture representation in the store 5 is better suited to threshold coding due to the similar magnitude of the components and the microprocessor thus performs this different compression method on that data. The resultant compressed data from the stores 4, 5 is then stored in a disc store 6 (step 25).

The data can be regenerated by reversing the steps above to generate the edge and texture representations which are then summed.

I claim:

1. A method of compressing digital image or image-like pixel data of an image, said pixel data comprising a plurality of pixels, the method comprising carrying out the following steps on small blocks of said pixels, said small blocks containing fewer of said pixels than does said image:
   (a) determining the differences between digital values of adjacent pixels in each of said small blocks to define respective link weights;
   (b) determining a tree connecting all said pixels in said each of said small blocks such that the sum of said link weights in said tree is a minimum;
   (c) dividing said tree into segments by removing links with weights greater than a threshold value, so dividing said each of said small blocks into segments of linked pixels;
   (d) generating a segmented representation of said each of said small blocks by setting the values of all pixels in each segment to a single respective, representational value; and
   (e) compressing said segmented representation to generate compressed data.

2. A method according to claim 1, further comprising generating a texture representation of said each of said small blocks constituted by the differences between each actual pixel value in said each of said small blocks and said corresponding segmented representation pixel value.

3. A method according to claim 2, further comprising compressing said texture representation.

4. A method according to claim 3, wherein said texture representation is compressed using a thresholding technique.

5. A method according to claim 1, wherein said segmented representation is compressed using one of a run length and quadtree compression.

6. A method according to claim 1, wherein the representational value is the average of the pixel values in the segment.

7. Apparatus for compressing digital image or image-like pixel data of an image, said pixel data comprising a plurality of pixels, the apparatus comprising:
    means for determining said differences between digital values of adjacent pixels in each of a plurality of small blocks of pixels to define respective link weights, each of said small blocks containing fewer of said pixels than does said image;
    means for determining a tree connecting all the pixels in each of said small blocks such that said sum of said link weights in said tree is a minimum;
    means for dividing said tree into segments by removing links with weights greater than a threshold value, so dividing said each of said small blocks into segments of linked pixels;
    means for generating a segmented representation of said each of said small blocks by setting said values of all pixels in each segment to a single, respective, representational value; and
    means for compressing said segmented representation to generate compressed data.

8. Apparatus according to claim 7, further comprising means for generating a texture representation of said each of said small blocks constituted by said differences between each actual pixel value in said each of said small blocks and said corresponding segmented representation pixel value.

9. Apparatus according to claim 8, further comprising means for compressing said texture representation.

10. A method of compressing digital image or image-like pixel data of an image, said pixel data comprising a plurality of pixels, the method comprising carrying out the following steps on small blocks of said pixels, wherein said small blocks are small with respect to smooth features of said image as defined by changes in said values as between adjacent ones of said pixels within said image:
    a) determining the differences between digital values of adjacent pixels in each of said small blocks to define respective link weights;
    b) determining a tree connecting all said pixels in said each of said small blocks such that the sum of said link weights in said tree is a minimum;
    c) dividing said tree into segments by removing links with weights greater than a threshold value, so dividing said each of said small blocks into segments of linked pixels;
    d) generating a segmented representation of said each of said small blocks by setting the values of all pixels in each segment to a single respective, representational value; and
    e) compressing said segmented representation to generate compressed data.

11. Apparatus for compressing digital image or image-like pixel data of an image, said pixel data comprising a plurality of pixels, the apparatus comprising:
    means for determining said differences between digital values of adjacent pixels in each of a plurality of small blocks of pixels to define respective link weights, wherein each of said small blocks are small with respect to smooth features of the image as defined by changes in said values as between adjacent ones of said pixels within said image;
    means for determining a tree connecting all the pixels in each of said small blocks such that said sum of said link weights in said tree is a minimum;
    means for dividing said tree into segments by removing links with weights greater than a threshold value, so dividing said each of said small blocks into segments of linked pixels;
    means for generating a segmented representation of said each of said small blocks by setting said values of all pixels in each segment to a single, respective, representational value; and
    means for compressing said segmented representation to generate compressed data.

* * * * *